(12) United States Patent
Mizunuma et al.

(10) Patent No.: US 9,792,032 B2
(45) Date of Patent: Oct. 17, 2017

(54) INFORMATION PROCESSING APPARATUS, INFORMATION PROCESSING METHOD, AND PROGRAM FOR CONTROLLING MOVEMENT OF CONTENT IN RESPONSE TO USER OPERATIONS

(71) Applicant: Sony Corporation, Minato-ku (JP)

(72) Inventors: Hiroyuki Mizunuma, Tokyo (JP); Ikuo Yamano, Tokyo (JP); Yuhei Taki, Kanagawa (JP); Kunihito Sawai, Kanagawa (JP); Yusuke Nakagawa, Tokyo (JP); Keisuke Yamaoka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 253 days.

(21) Appl. No.: 14/336,391

(22) Filed: Jul. 21, 2014

(65) Prior Publication Data

US 2015/0033181 A1 Jan. 29, 2015

(30) Foreign Application Priority Data

Jul. 26, 2013 (JP) ................................. 2013-155448

(51) Int. Cl.
*G06F 3/0485* (2013.01)
*G06F 1/16* (2006.01)

(52) U.S. Cl.
CPC ............ *G06F 3/0485* (2013.01); *G06F 1/169* (2013.01)

(58) Field of Classification Search
CPC ...................................................... G06F 1/169
USPC ......................................................... 715/784
See application file for complete search history.

(56) References Cited

U.S. PATENT DOCUMENTS

| | | | | |
|---|---|---|---|---|
| 7,152,210 | B1* | 12/2006 | Van Den Hoven ... | G06F 3/0482 707/E17.111 |
| 2003/0043174 | A1* | 3/2003 | Hinckley ............ | G06F 3/03547 345/684 |
| 2004/0150630 | A1* | 8/2004 | Hinckley ............. | G06F 3/0418 345/173 |
| 2007/0290994 | A1* | 12/2007 | Kawasaki ............... | G06F 3/038 345/157 |
| 2009/0235207 | A1* | 9/2009 | Choi ...................... | G06F 3/0485 715/851 |
| 2010/0123734 | A1* | 5/2010 | Ozawa ................... | G06F 3/0488 345/619 |
| 2010/0188344 | A1* | 7/2010 | Shirakawa ............. | G06F 3/0481 345/173 |
| 2010/0283753 | A1* | 11/2010 | Ohshita .................... | G06F 3/038 345/173 |
| 2011/0050608 | A1* | 3/2011 | Homma ................. | G06F 3/0414 345/173 |

(Continued)

FOREIGN PATENT DOCUMENTS

JP 2012-203484 10/2012

*Primary Examiner* — Tadeese Hailu
*Assistant Examiner* — Alvaro R Calderon, IV
(74) *Attorney, Agent, or Firm* — Oblon, McClelland, Maier & Neustadt, L.L.P.

(57) ABSTRACT

There is provided an information processing apparatus including an input operating unit configured to receive an input operation from a user, the input operation allowing content to be scrolled, and a setting control unit configured to change a setting of a scrolling direction for the content on the basis of a situation in which the input operation has been performed.

11 Claims, 11 Drawing Sheets

(56) References Cited

U.S. PATENT DOCUMENTS

| | | | |
|---|---|---|---|
| 2011/0122078 A1* | 5/2011 | Kasahara | G06F 3/0488 345/173 |
| 2011/0202880 A1* | 8/2011 | Kawana | G06F 3/0482 715/830 |
| 2011/0252383 A1* | 10/2011 | Miyashita | G06F 3/04886 715/863 |
| 2012/0030636 A1* | 2/2012 | Miyazaki | G06F 3/0488 715/863 |
| 2012/0044172 A1* | 2/2012 | Ohki | G06F 3/04883 345/173 |
| 2012/0110518 A1* | 5/2012 | Chan | G06F 3/018 715/863 |
| 2012/0144341 A1* | 6/2012 | Torigoe | G06F 3/04883 715/784 |
| 2012/0147052 A1* | 6/2012 | Homma | G06F 3/044 345/660 |
| 2012/0147058 A1* | 6/2012 | Torigoe | G06F 3/0488 345/684 |
| 2012/0167002 A1* | 6/2012 | Torigoe | G06F 3/0488 715/784 |
| 2012/0272181 A1* | 10/2012 | Rogers | G06F 3/0482 715/784 |
| 2013/0044140 A1* | 2/2013 | Kim | G06F 3/0485 345/684 |
| 2013/0132892 A1* | 5/2013 | Lentz | G06F 3/04855 715/786 |
| 2013/0208313 A1* | 8/2013 | Maeda | G06F 3/0483 358/1.15 |
| 2013/0321474 A1* | 12/2013 | Horiike | G09G 5/34 345/684 |
| 2014/0022194 A1* | 1/2014 | Ito | G06F 3/0488 345/173 |
| 2014/0137031 A1* | 5/2014 | Aoki | G06F 17/30905 715/784 |
| 2014/0139471 A1* | 5/2014 | Matsuki | G06F 3/0485 345/173 |
| 2014/0240364 A1* | 8/2014 | Ishikawa | G09G 5/34 345/684 |
| 2014/0267115 A1* | 9/2014 | Jeon | G06F 3/041 345/173 |
| 2014/0285507 A1* | 9/2014 | Sato | G09G 5/37 345/582 |

* cited by examiner

INFORMATION PROCESSING APPARATUS, INFORMATION PROCESSING METHOD, AND PROGRAM FOR CONTROLLING MOVEMENT OF CONTENT IN RESPONSE TO USER OPERATIONS

CROSS REFERENCE TO RELATED APPLICATIONS

This application claims the benefit of Japanese Priority Patent Application JP 2013-155448 filed Jul. 26, 2013, the entire contents of which are incorporated herein by reference.

BACKGROUND

The present disclosure relates to an information processing apparatus, an information processing method, and a program.

More and more people have been beginning to use information processing apparatuses to view a variety of content in recent years. Content viewed in this way has so vast information that information processing apparatuses are sometimes unable to show all the information at a time.

In that case, a display approach called scrolling is used in which content is horizontally or vertically slid on the basis of an instruction from a user, and information that has not yet been displayed is sequentially displayed, allowing the user to view the entire content.

For example, JP 2012-203484A discloses a technique for asking a user to touch a touch pad with his or her finger, and if the user performs an input operation such as sliding his or her finger, content is scrolled in response to the input operation.

SUMMARY

However, in the technique disclosed in JP 2012-203484A, a scrolling direction intended by a user for an input operation is sometimes different from a scrolling direction that has been set for the input operation. In such a case, a user may possibly feel uncomfortable with the movement of content in response to the input operation.

It is therefore desired to propose an information processing apparatus that automatically changes the setting of a scrolling direction for content on the basis of a situation in which a user has performed an input operation.

According to an embodiment of the present disclosure, there is provided an information processing apparatus including an input operating unit configured to receive an input operation from a user, the input operation allowing content to be scrolled, and a setting control unit configured to change a setting of a scrolling direction for the content on the basis of a situation in which the input operation has been performed.

According to another embodiment of the present disclosure, there is provided an information processing method including receiving an input operation from a user, the input operation allowing content to be scrolled, and changing a setting of a scrolling direction for the content on the basis of a situation in which the input operation has been performed.

According to still another embodiment of the present disclosure, there is provided a program for causing a computer to function as an input operating unit configured to receive an input operation from a user, the input operation allowing content to be scrolled, and a setting control unit configured to change a setting of a scrolling direction for the content on the basis of a situation in which the input operation has been performed.

According to an embodiment of the present disclosure, it is possible to automatically change the setting of a scrolling direction for content on the basis of a situation in which a user has performed an input operation.

According to one or more of embodiments of the present disclosure, it is possible to prevent a user from feeling uncomfortable with the movement of content in response to an input operation.

DETAILED DESCRIPTION OF THE EMBODIMENT(S)

Figure 1A:
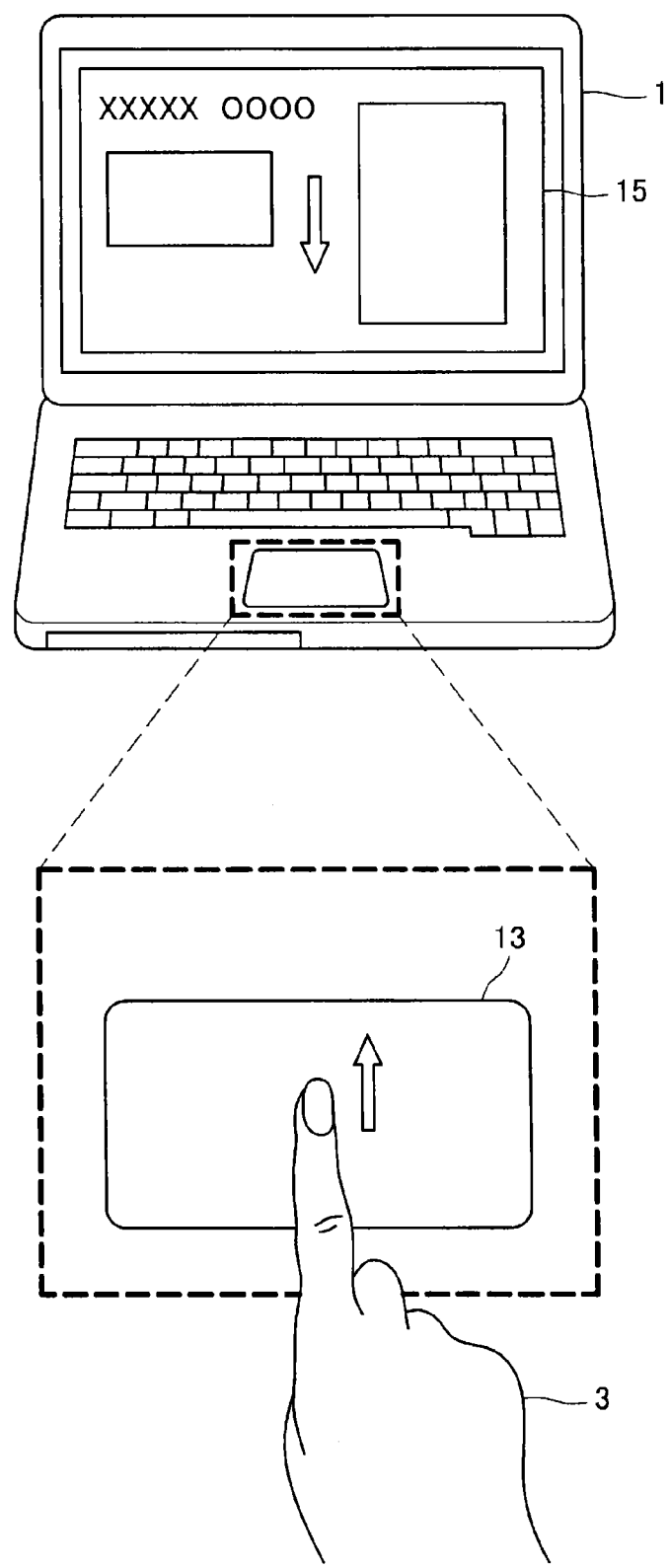
FIG. 1A is an explanatory diagram illustrating an example of an information processing apparatus according to an embodiment of the present disclosure and an example of a response of the information processing apparatus to an operation of a user.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Overview of Information Processing Apparatus According to Embodiment of Present Disclosure
2. Information Processing Apparatus According to First Embodiment
    2.1. Internal Configuration of Information Processing Apparatus according to First Embodiment
    2.2. Operation of Information Processing Apparatus according to First Embodiment
        2.2.1. Example of Operation of Information Processing Apparatus according to First Embodiment
        2.2.2. Modified Example of Operation of Information Processing Apparatus according to First Embodiment
3. Information Processing Apparatus according to Second Embodiment
    3.1. Internal Configuration of Information Processing Apparatus according to Second Embodiment
    3.2. Example of Operation of Information Processing Apparatus according to Second Embodiment
4. Hardware Configuration of Information Processing Apparatus according to Embodiment of Present Disclosure
5. Conclusion

1. OVERVIEW OF INFORMATION PROCESSING APPARATUS ACCORDING TO EMBODIMENT OF PRESENT DISCLOSURE

Figure 1B:
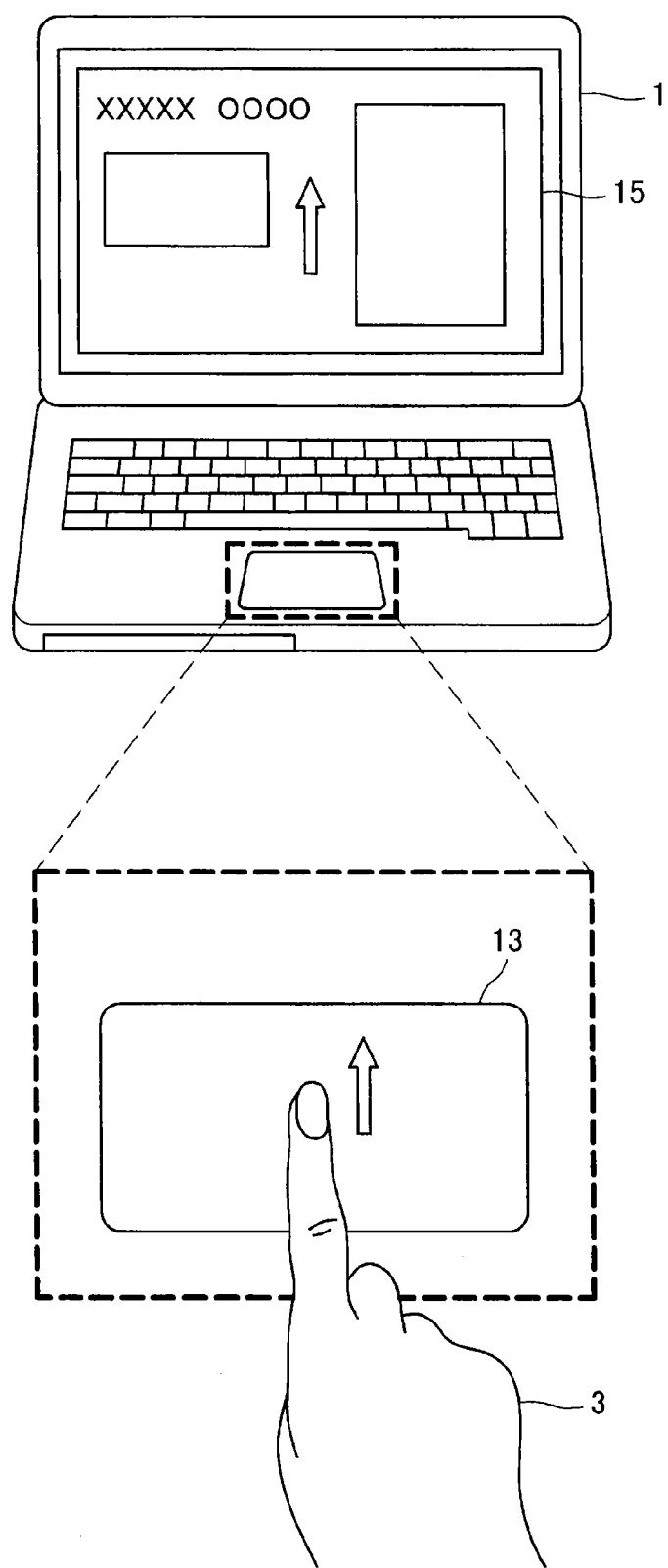
FIG. 1B is an explanatory diagram illustrating another example of the response of the information processing apparatus according to the embodiment of FIG. 1A to the operation of the user.

An overview of an information processing apparatus according to an embodiment of the present disclosure will be now described with reference to FIGS. 1A and 1B. FIG. 1A is an explanatory diagram illustrating an example of an information processing apparatus 1 and an example of a response of the information processing apparatus 1 to an operation of a user. FIG. 1B is an explanatory diagram illustrating another example of the response of the information processing apparatus 1 to the operation of the user.

As illustrated in FIGS. 1A and 1B, the information processing apparatus 1 includes a display unit 15 and an input operating unit 13. A user 3 operates the input operating unit 13 and allows the information processing apparatus 1 to scroll content displayed on the display unit 15. The information processing apparatus 1 scrolls content in response to an input in different scrolling directions in FIGS. 1A and 1B, the input being made by the user 3 to the input operating unit 13.

The information processing apparatus 1 performs information processing of scrolling content displayed on the display unit 15 in response to an operation performed by the user 3 on the input operating unit 13. Examples of the information processing apparatus 1 include notebook computers equipped with a touch pad as the input operating unit 13. Examples of the information processing apparatus 1 may include game consoles, TV receivers, and mobile phones other than the above-mentioned examples.

Additionally, the information processing apparatus 1 does not also have to include the display unit 15. The information processing apparatus 1 may be, for example, an input device such as a remote controller and a controller that allows content displayed on an external display device to be scrolled in response to an input operation performed by the user 3 on the input operating unit 13.

The input operating unit 13 receives an input operation from the user 3, the input operation requesting scrolling. Specifically, the input operating unit 13 includes, for example, an input unit with which the user 3 can request scrolling in two or more directions and an input control circuit configured to generate and output an input signal on the basis of an input made by the user 3. Examples of the input operating unit 13 herein include touch pads. The input operating unit 13 is not limited thereto, but may also be, for example, a mouse, a trackball, a rotational wheel, a jog dial, a ring-shaped dial, a cross key, a motion sensor, an attitude sensor such as a gyro sensor and an acceleration sensor, and an optical finger navigation (OFN).

The information processing apparatus 1 may also include a plurality of input operating units 13. In this case, the information processing apparatus 1 can recognize which of the input operating units 13 an input operation has been performed from, and can scroll content in response to the input operation from each input operating unit 13.

An input operation from these input operating units 13 which requests scrolling is not herein particularly limited in the present embodiment as long as the input operation can request scrolling in two or more directions. Examples of input operations that request scrolling may include "swipes" of sliding a finger on a touch pad in a single direction, "edge swipes" of swiping from an edge to the center, "drags" on a touch pad with depression on the touch pad or depression of another key, and predetermined "gestures" such as drawing a circle.

Other examples of input operations requesting scrolling may further include wheel operations of a mouse, "drags" with depression of the left button of a mouse, operations of inclining the housing of the information processing apparatus 1 by a given amount or more, which are detected by an attitude sensor, and predetermined "gestures" detected by a motion sensor.

The display unit 15 displays content or the like. The display unit 15 may be a display device such as a liquid crystal display (LCD) device, an organic light emitting diode (OLED) device, a plasma display device, and a cathode ray tube (CRT) display device.

Content displayed on the display unit 15 is a bunch of information the whole of which can be displayed through scrolling because a displayable region of the content is larger than a region that the display unit 15 can display at a time. Examples of content displayed on the display unit 15 include web pages displayed by web browsers. Other examples of content displayed on the display unit 15 include images displayed by viewers, predetermined areas in maps, screens on which icons are displayed, and text displayed by text editors.

The user 3 performs an input operation on the input operating unit 13. Specifically, the user 3 operates the input operating unit 13 and requests scrolling in order to cause the display unit 15 to display a region of content that has not yet been displayed.

The information processing apparatus 1 can then execute, for example, any one of two patterns of scrolling operations on the input operation performed by the user 3. Specifically, as illustrated in FIG. 1A, the information processing apparatus 1 can perform a scrolling operation of scrolling content from the top to the bottom if the user 3 takes a swipe from the bottom to the top. Alternatively, as illustrated in FIG. 1B, the information processing apparatus 1 can perform a scrolling operation of scrolling content from the bottom to the top if the user 3 takes a swipe from the bottom to the top. The setting of a content viewer or the information processing apparatus has decided which pattern of scrolling operations the information processing apparatus 1 performs.

If a scrolling direction intended by the user 3 for the input operation is different from the actually set scrolling direction for the input operation, the user 3 sometimes feels uncomfortable with the scrolling operation of the information processing apparatus. When, for example, the upper end of content is displayed, the user 3 performs an input operation to scroll the content from the upper end to the lower end. However, if the set scrolling direction is opposite to a scrolling direction intended by the user 3, the information processing apparatus, which has already shown the upper end of the content, is unable to change the display because the information processing apparatus is trying to scroll the content from the lower end to the upper end. In this case, it thus confuses the user 3 that the content is not scrolled at all even though the user 3 has requested scrolling.

The information processing apparatus 1 according to the embodiment of the present disclosure can automatically change the setting of a scrolling direction for content on the basis of a situation in which the user 3 has performed an input operation. Specifically, if a scrolling direction intended by the user 3 for an input operation is likely to be different from the set scrolling direction, the information processing apparatus 1 can change the setting of a scrolling direction such that the user 3 does not feel uncomfortable.

Although FIGS. 1A and 1B have shown that the information processing apparatus 1 vertically scrolls content, the present disclosure is not limited thereto. For example, the information processing apparatus 1 may also horizontally scroll content. In addition, the information processing apparatus 1 may scroll content in the two-dimensional direction including the vertical direction and the horizontal direction.

Additionally, the information processing apparatus 1 according to the embodiment of the present disclosure may have the input operating unit 13 and the display unit 15 formed in the same region. Specifically, the information processing apparatus 1 may include, on the display unit 15 displaying content, a touch panel that the user 3 directly touches and operates with his or her finger.

However, if the display unit 15 and the input operating unit 13 are separately configured, a scrolling direction intended by the user 3 for an input operation is more likely to be different from the set scrolling direction for the input operation. The information processing apparatus 1 according to the embodiment of the present disclosure can therefore be used more efficiently when the input operating unit 13 is separately configured in a different region from the display unit 15.

2. INFORMATION PROCESSING APPARATUS ACCORDING TO FIRST EMBODIMENT

Figure 2:
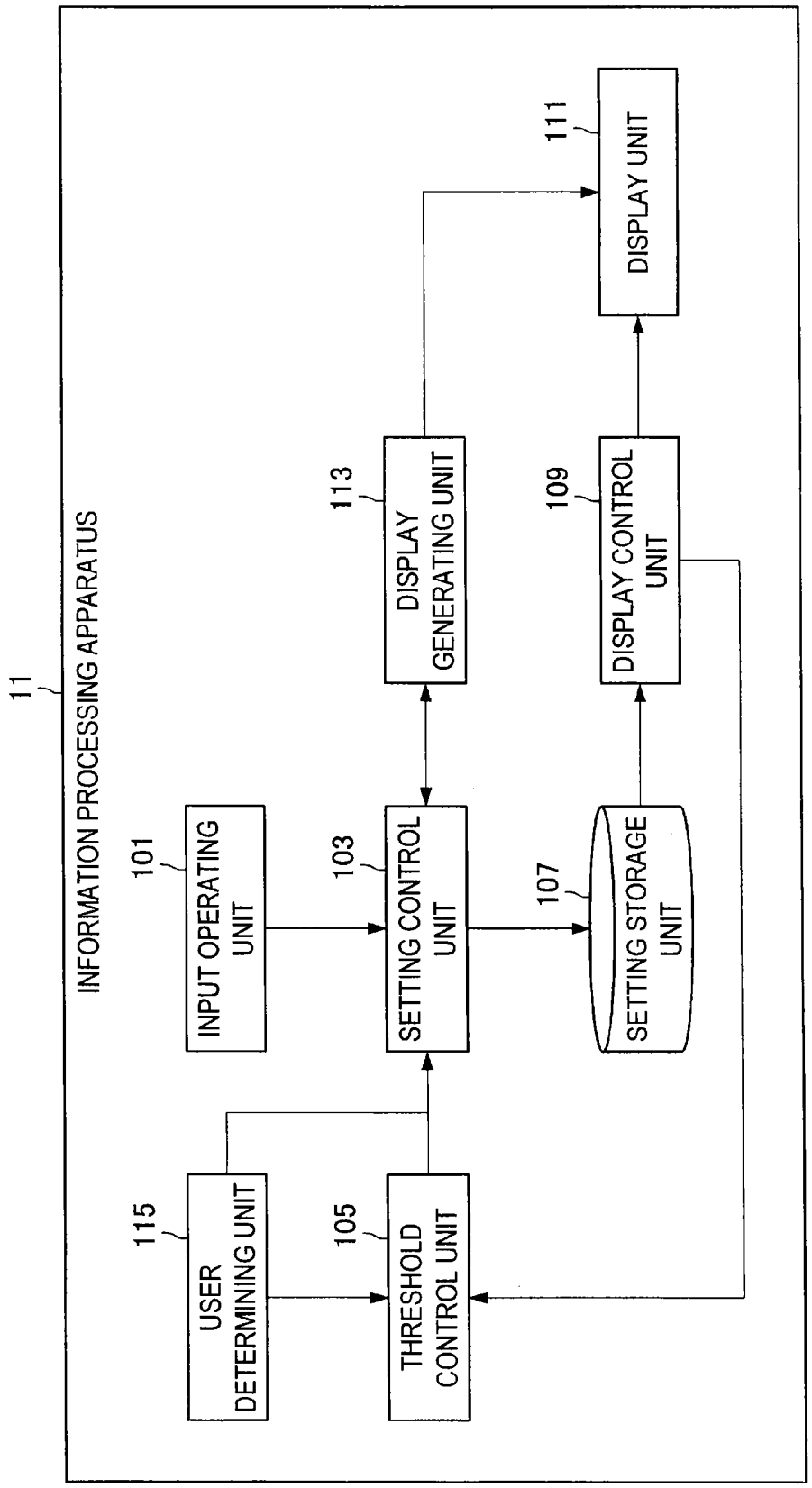
FIG. 2 is a block diagram describing an internal configuration of an information processing apparatus according to a first embodiment.

2.1. Internal Configuration of Information Processing Apparatus According to First Embodiment The description will be made below with reference to FIG. 2 on a specific configuration for implementing an information processing apparatus 11 according to a first embodiment of the present disclosure, which has the above-described effects. FIG. 2 is a block diagram describing an internal configuration of the information processing apparatus 11 according to the first embodiment of the present disclosure.

As illustrated in FIG. 2, the information processing apparatus 11 according to the first embodiment of the present disclosure includes an input operating unit 101, a setting control unit 103, a threshold control unit 105, a setting storage unit 107, a display control unit 109, a display unit 111, a display generating unit 113, and a user determining unit 115. Additionally, the user determining unit 115 is optionally included in the information processing apparatus 11. That is, the information processing apparatus 11 does not also have to include the user determining unit 115.

The input operating unit 101 receives an input operation from the user 3, the input operation requesting scrolling. Specifically, the input operating unit 101 acquires, from the input operation performed by the user 3, a direction and an operation distance of the input operation, and transmits the direction and the operation distance to the setting control unit 103. As discussed above, the input operating unit 101 is, for example, a touch pad. A plurality of input operating units 101 may also be provided.

The setting control unit 103 determines whether to change the setting of a scrolling direction on the basis of a situation in which the user 3 has performed an input operation on the input operating unit 101. Specifically, the setting control unit 103 receives the direction and the operation distance of the input operation performed by the user 3 from the input operating unit 101, and changes the setting of a scrolling direction on the basis of whether it is possible to scroll content in the direction of the input operation. The setting control unit 103 may also change the setting of a scrolling direction on the basis of whether the operation distance of the input operation is greater than or equal to a threshold. A threshold will be described below along with the description of the threshold control unit 105.

More specifically, the control setting unit 103 determines whether it is possible to scroll content in a scrolling direction that has been set for an input operation of the user 3. If, for example, an end of content is displayed and the content is scrolled from the other end to the displayed end in accordance with the scrolling direction set for the input operation, the setting control unit 103 determines that it is not possible to scroll the content. In such a case, the setting control unit 103 determines that a scrolling direction intended by the user 3 for an input operation is not the same as the set scrolling direction, and reverses the setting of a scrolling direction for the input operation.

If it is possible to scroll content (such as a map) in the two-dimensional direction including the vertical direction and the horizontal direction, the information processing apparatus 11 reverses the setting of a scrolling direction with respect to one direction of the vertical direction or the horizontal direction, the one direction including the scrolling direction set for the input operation of the user 3.

Meanwhile, if it is possible to scroll content in the scrolling direction set for the input operation, the setting control unit 103 determines that a scrolling direction intended by the user 3 for the input operation is the same as the set scrolling direction. If so, the setting control unit 103 does not change the setting of a scrolling direction for the input operation.

In addition, if the setting control unit 103 is unable to scroll content in a scrolling direction set for an input operation, the setting control unit 103 may determine whether an operation distance of the input operation is greater than or equal to a threshold. If the operation distance is greater than or equal to the threshold, the setting control unit 103 changes the setting of a scrolling direction for the input operation.

If, for example, the user 3 successively performs input operations for scrolling content in a single direction, the user 3 is sometimes late in recognizing that an end of the content is displayed through scrolling. In such a case, even though the end has been displayed, the user 3 may further scroll the content from the other end to the displayed end. Meanwhile, according to the above-described configuration, as long as an operation distance is less than or equal to a threshold, the setting of a scrolling direction is not changed even when it is not possible to scroll content in a scrolling direction set for the input operation. Thus, according to the configuration, if an input operation is determined as an operation error of the user 3, it is possible to enhance the convenience of the user 3 by maintaining the setting of a scrolling direction.

If the setting control unit 103 changes the setting of a scrolling direction for an input operation, the setting control unit 103 may uniformly change the setting of a scrolling direction for all the content displayed by the information processing apparatus 11. The setting control unit 103 may also change the setting of a scrolling direction for only content displayed when the setting control unit 103 has determined that the setting of scrolling direction is changed.

The threshold control unit 105 changes a threshold used to determine whether to change the setting for a scrolling direction. Specifically, the threshold control unit 105 changes a threshold used to determine whether to change the setting of a scrolling direction into a smaller value if a threshold changing condition is satisfied.

Satisfying a threshold changing condition means, for example, performing an input operation at an end of content, more specifically at the upper end, the left end, or the right end of content. The upper end, the left end, or the right end of most content is an initial position when the content is displayed. Accordingly, if an input operation performed when such a position is displayed is set for scrolling content in a direction in which it is not possible to scroll the content, the user 3 is very likely to feel uncomfortable because the display of the content does not move even though the input operation has been performed. Thus, the threshold control unit 105 preferably changes a threshold into a smaller value to facilitate the setting control unit 103 to change the setting of a scrolling direction.

Satisfying a threshold changing condition also means that, for example, an input operation performed on content displays the content and then requests first scrolling. In the case of the input operation that displays content and then requests first scrolling, a scrolling direction intended by the user 3 for the input operation is very likely to be different from the set scrolling direction. Thus, the threshold control unit 105 preferably changes a threshold into a smaller value to facilitate the setting control unit 103 to change the setting of a scrolling direction.

Satisfying a threshold changing condition means that, for example, an input operation performed on content through the input operating unit 101 requests first scrolling after a predetermined non-operating time (such as 3 hours) has passed. When the input operation requesting first scrolling after a predetermined non-operating time has passed is performed, the user 3 is likely to be a different person from the person before the predetermined non-operating time has passed. Even if the user 3 is the same person, the user 3 has possibly forgotten the scrolling direction set for the input operation. Thus, the threshold control unit 105 preferably changes a threshold into a smaller value to facilitate the setting control unit 103 to change the setting of a scrolling direction.

Satisfying a threshold changing condition also means that, for example, the user 3 changes. When another user performs an input operation, a scrolling direction that has been set by the previous user 3 is very likely to be different from a scrolling direction intended by the other user for the input operation. Thus, the threshold control unit 105 preferably changes a threshold into a smaller value to facilitate the setting control unit 103 to change the setting of a scrolling direction.

Additionally, the threshold control unit 105 may individually use the above-described threshold changing conditions to determine whether to change a threshold, or may also use a combination of the threshold changing conditions to determine whether to change a threshold.

The setting storage unit 107 stores the setting of a scrolling direction for an input operation. Specifically, the setting storage unit 107 stores the initial setting of a scrolling direction for the input operation, and the setting of scrolling direction changed by the setting control unit 103. The setting of a scrolling direction changed by the setting control unit 103 is stored and remains in the setting storage unit 107 so that the user 3 can continue to use the setting of a scrolling direction intended by the user 3.

If a plurality of input operating units 101 is provided, the above-described setting control unit 103, threshold control unit 105, and setting storage unit 107 may independently determine the setting of a scrolling direction, set a threshold, and store the changed setting for each input operating unit 101.

The user determining unit 115 determines whether the users 3 using the information processing apparatus 11 are the same or different. The user determining unit 115 may, for example, include a camera for shooting video of the users 3, and recognize each of the users 3 by applying facial recognition technology to the video shot by the camera. The user determining unit 115 may also include a fingerprint authentication device, a vein authentication device, or a voice authentication device, and recognize each of the users 3 by finger authentication, vein authentication, or voice authentication. The user determining unit 115 may further recognize the users 3 from tendencies of input operations in the input operating unit 101. The user determining unit 115 may, for example, recognize each of the users 3 from contact pressure of fingers or contact areas of fingers on a touch pad.

According to the configuration, the information processing apparatus 11 can use it as a threshold changing condition that the user 3 has changed. The information processing apparatus 11 may store the changed setting of a scrolling direction in association with each user 3 to automatically reflect the setting of a scrolling direction corresponding to each user 3.

The display control unit 109 controls scrolling of content. Specifically, the display control unit 109 controls scrolling of content displayed by the display unit 111 on the basis of the setting of a scrolling direction for an input operation, the setting being stored in the setting storage unit 107. The display control unit 109 may also detect which of the upper end, the left end, the right end, and the lower end of content a position displayed by the display unit 111 is with respect to a displayable region of the content, and may send it to the threshold control unit 105.

The display unit 111 displays content or the like. Specifically, the display unit 111 displays a part of content, and displays a region of the content that has not yet been displayed through scrolling. The display unit 111 may also display a notification indicating that the setting of a scrolling direction has been changed, the notification being generated by the display generating unit 113. The display unit 111 may be, for example, a liquid crystal display device, an OLED device, a plasma display device, a CRT display device, and the like.

The display generating unit 113 generates display notifying the user 3 that the setting of a scrolling direction has been changed. Specifically, when the setting control unit 103 changes the setting of a scrolling direction for an input operation, the display generating unit 113 generates display for notifying the user 3 that the setting of a scrolling direction has been changed. If the user 3 is notified in the forms of letters that the setting of a scrolling direction has been changed, the display generating unit 113 may generate voice reading the letters aloud.

The display generating unit 113 generates display asking the user 3 to choose whether to change the setting of a scrolling direction, when the setting control unit 103 changes the setting of a scrolling direction for an input operation. If the user 3 chooses to change the setting of a scrolling direction in the generated display, the setting control unit 103 changes the setting of a scrolling direction. To the contrary, if the user 3 chooses not to change the setting of a scrolling direction in the generated display, the setting control unit 103 does not change the setting of a scrolling direction.

According to the configuration, the information processing apparatus 11 can ask the user 3 whether to change the setting of a scrolling direction, when the setting of a scrolling direction is changed. Thus, the information processing apparatus 11 can prevent the setting of a scrolling direction from being changed through an operation error, which is not intended by the user 3.

Figure 5:
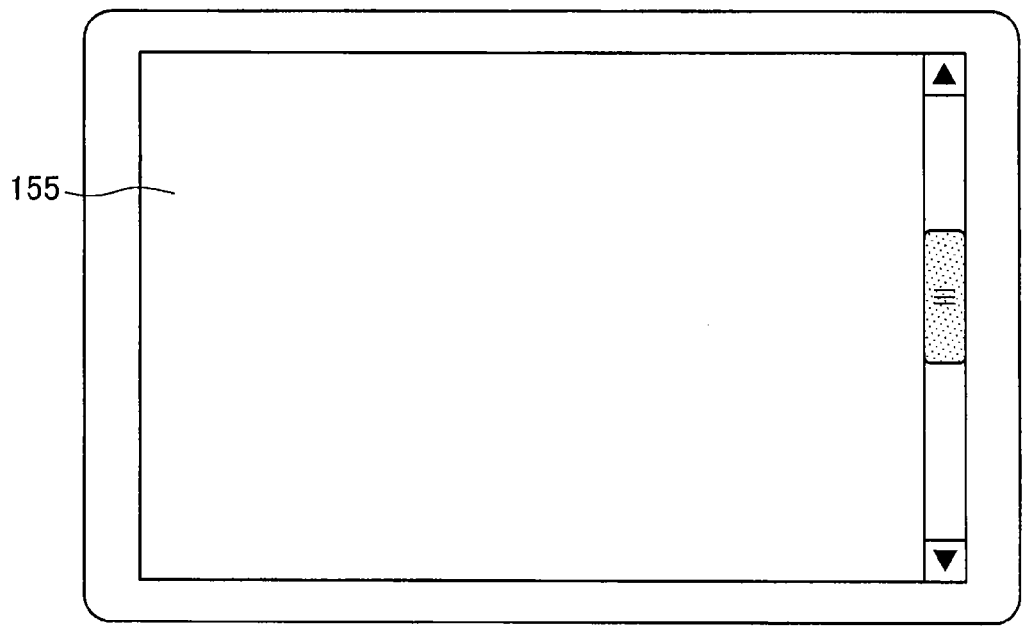
FIG. 5 is an explanatory diagram illustrating an example of display indicating that a setting of a scrolling direction has been changed.
Figure 6:
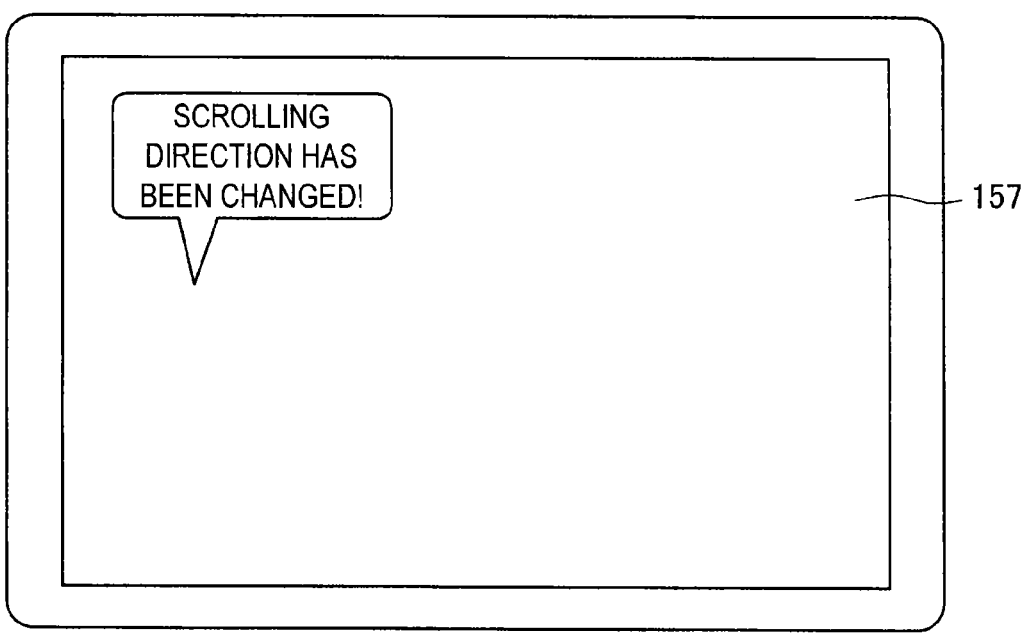
FIG. 6 is an explanatory diagram illustrating an example of display indicating that a setting of a scrolling direction has been changed.
Figure 7:
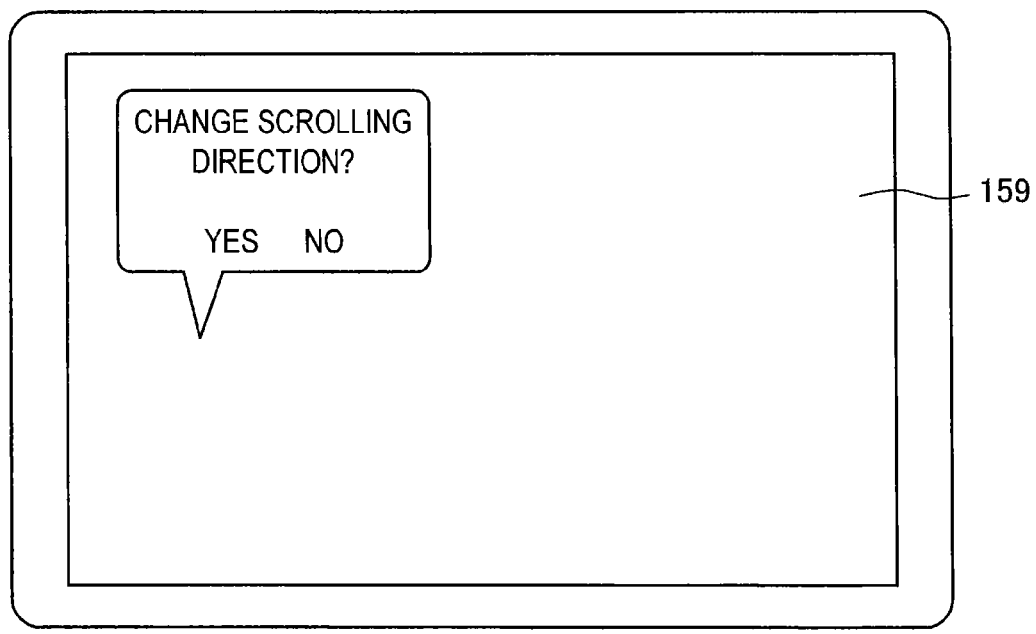
FIG. 7 is an explanatory diagram illustrating an example of display asking a user to choose whether to change a setting of a scrolling direction.

FIGS. 3 to 7 illustrate examples of display notifying the user 3 that the setting of a scrolling direction has been changed, the display being generated by the display generating unit 113. FIGS. 3 to 6 each are an explanatory diagram illustrating an example of display indicating that the setting of a scrolling direction has been changed. FIG. 7 is an explanatory diagram illustrating an example of display asking the user 3 to choose whether to change the setting of a scrolling direction. Additionally, let us assume in FIGS. 3 to 7 that content can be vertically scrolled.

Figure 3:
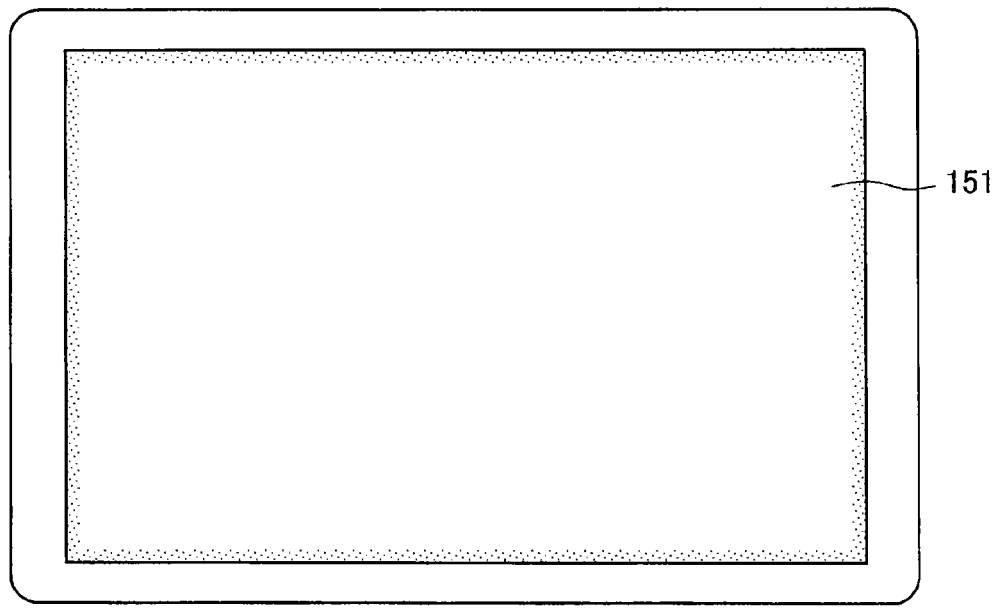
FIG. 3 is an explanatory diagram illustrating an example of display indicating that a setting of a scrolling direction has been changed.

As illustrated in FIG. 3, a first screen display example 151 changes a color of an end of content to notify the user 3 that the setting of a scrolling direction has been changed. Specifically, the display generating unit 113 may change a color of the whole or a part of an end of content into a conspicuous color such as red to notify the user 3 that the setting of a scrolling direction has been changed.

Figure 4:
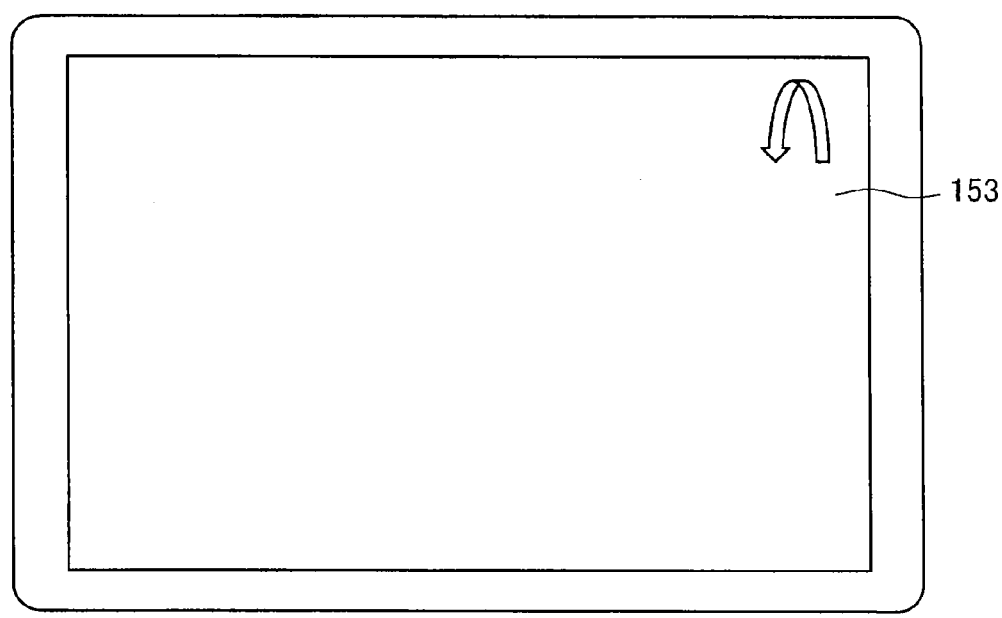
FIG. 4 is an explanatory diagram illustrating an example of display indicating that a setting of a scrolling direction has been changed.

As illustrated in FIG. 4, a second screen display example 153 displays a reverse arrow on content or around content to notify the user 3 that the setting of a scrolling direction has been changed. Specifically, a display generating unit 113 may display an upward and downward reverse arrow to notify the user 3 that the setting of the upward and downward scrolling direction has been changed.

As illustrated in FIG. 5, a third screen display example 155 changes a color of the scroll bar to notify the user 3 that the setting of a scrolling direction has been changed. Specifically, the display generating unit 113 changes a color of the knob in the scroll bar into a conspicuous color such as red to notify the user 3 that the setting of a scrolling direction has been changed, the knob indicating a currently displayed position and a ratio of the currently displayed position to the whole content.

As illustrated in FIG. 6, a fourth screen display example 157 displays letters notifying the user 3 that the setting of a scrolling direction has been changed, and notifies the user 3 that the setting of a scrolling direction has been changed. Specifically, the display generating unit 113 may displays letters such as "SCROLLING DIRECTION HAS BEEN CHANGED" in a surrounded area like a balloon to notify the user 3 that the setting of a scrolling direction has been changed. The display generating unit 3 may also generates a balloon in a conspicuous color such as red to attract attention from the user 3. In addition to display in the form of a balloon indicating that the setting of a scrolling direction has been changed, the display generating unit 113 may further generate and output voice reading the display aloud to notify the user 3 that the setting of a scrolling direction has been changed. The display generating unit 113 may generate only voice indicating the setting of a scrolling direction has been changed to notify the user 3 that the setting of a scrolling direction has been changed only via the voice, without generating any display such as balloons indicating a change in the setting of a scrolling direction.

Furthermore, as illustrated in FIG. 7, a fifth screen display example 159 generates display asking the user 3 to choose whether to change the setting of a scrolling direction. Specifically, the display generating unit 113 may display letters such as "CHANGE SCROLLING DIRECTION?" in a surrounded area like a balloon and may display choices such as "YES" and "NO" for the user 3 to choose whether to change the setting of a scrolling direction. If the user 3 chooses "YES," the setting control unit 103 changes the setting of a scrolling direction. To the contrary, if the user 3 chooses "NO," the setting control unit 103 does not change the setting of a scrolling direction. In addition to display in a balloon asking whether to change the setting of a scrolling direction, the display generating unit 113 may further generate and output voice reading the display aloud to ask the user 3 to choose the choice. The display generating unit 113 may also generate only voice asking whether to change the setting of a scrolling direction to ask the user 3 to choose whether to change the setting of a scrolling direction, without generating any display such as balloons.

Additionally, a reverse arrow or a balloon may be displayed, for example, at a predetermined position such as the upper right of the display unit 111 in the second, fourth, and fifth screen display examples 153, 157, and 159. If a start position or an end position of an input operation (such as "drags" and swipes on the touch panel) requesting scrolling can be identified, a reverse arrow or a balloon may also be displayed at a position a predetermined distance away from the start position or the end position. If a pointer is displayed on the display unit 111, a reverse arrow or a balloon may further be displayed at a position a predetermined distance away from the pointer. Here, the predetermined-away position is, for example, 20 pixels away from the right side of and above the start position, the end position, or the pointer.

According to the configurations, if the information processing apparatus 11 is not able to scroll content in a scrolling direction set for an input operation of the user 3, the information processing apparatus 11 determines that a scrolling direction intended by the user 3 for the input operation is different from the set scrolling direction. If the information processing apparatus 11 is not able to scroll the content, the information processing apparatus 11 can automatically change the setting of a scrolling direction such that the user 3 does not feel uncomfortable.

The information processing apparatus 11 compares an operation distance of an input operation with a threshold, and may also change the setting of a scrolling direction as long as the operation distance is greater than or equal to the threshold. According to the configurations, if the information processing apparatus 11 determines that the input operation is an operation error of the user 3, the information processing apparatus 11 can enhance the convenience of the user 3 by maintaining the setting of a scrolling direction.

If the information processing apparatus 11 determines that a scrolling direction intended by the user 3 for an input operation is very likely to be different from the set scrolling direction, the information processing apparatus 11 may further change a threshold into a smaller value. According to the configurations, the information processing apparatus 11 prevents the setting of a scrolling direction from being changed through an operation error in usual use. Meanwhile, if the user 3 is very likely to feel uncomfortable, the information processing apparatus 11 facilitates the setting of a scrolling direction to be changed.

2.2. Operation of Information Processing Apparatus According to First Embodiment

Figure 8:
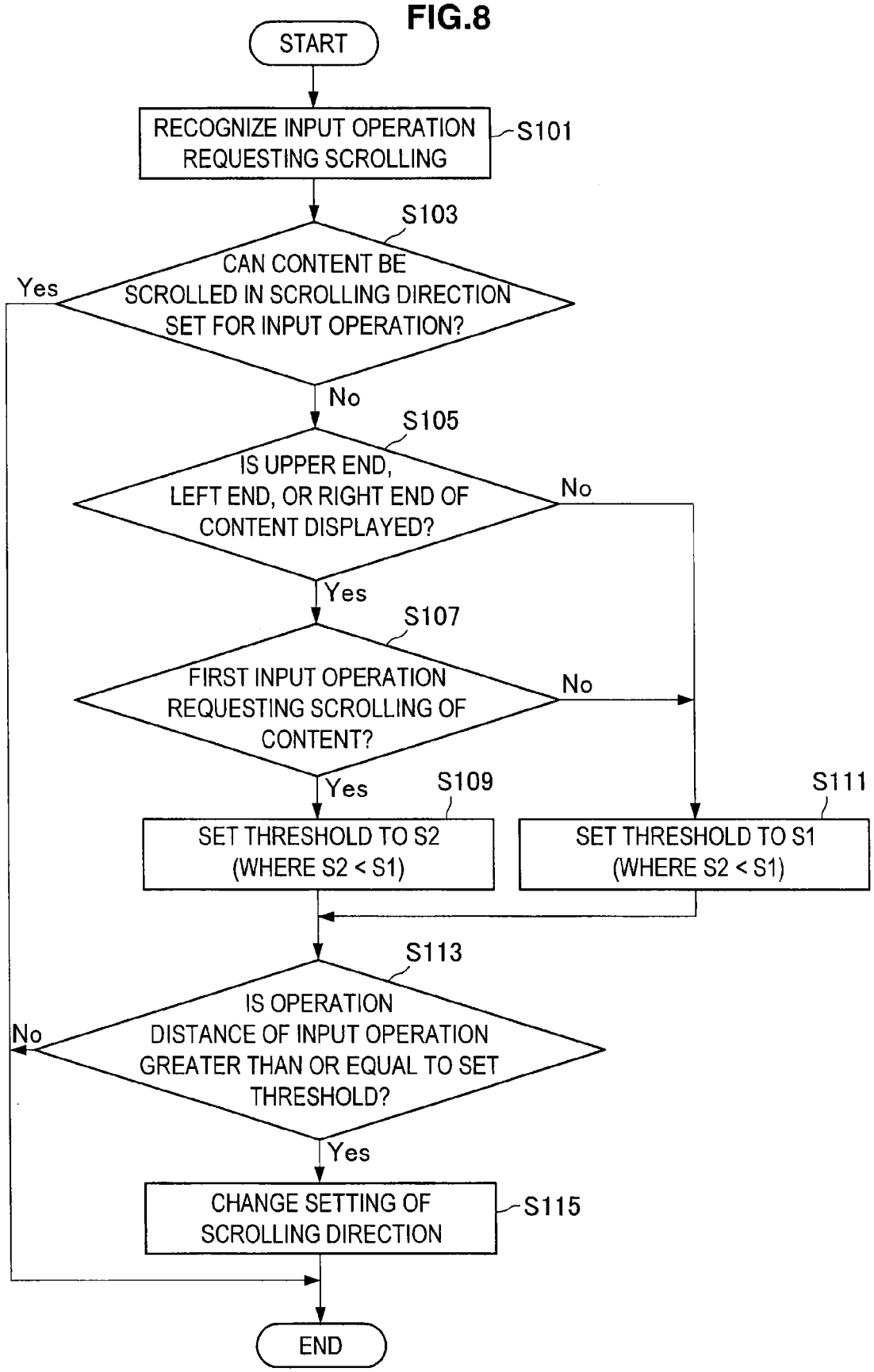
FIG. 8 is a flowchart illustrating an example of an operation of the information processing apparatus according to the first embodiment.

2.2.1. Example of Operation of Information Processing Apparatus According to First Embodiment Next, an example of an operation of the information processing apparatus 11 according to the first embodiment of the present disclosure will be described with reference to FIG. 8. FIG. 8 is a flowchart illustrating the example of the operation of the information processing apparatus 11 according to the first embodiment.

As illustrated in FIG. 8, the input operating unit 101 of the information processing apparatus 11 first recognizes an input operation from the user 3 (S101), the input operation requesting scrolling. Next, the setting control unit 103 determines whether content can be scrolled in a scrolling direction set for the input operation recognized by the input operating unit 101 (S103). If content can be scrolled in the scrolling direction set for the input operation (S103/Yes), the information processing apparatus 11 finishes the operation relating to a change in the setting of a scrolling direction and scrolls content as requested.

To the contrary, if it is not possible to scroll content in the scrolling direction set for the input operation (S103/No), the threshold control unit 105 determines whether the displayed position on the display unit 111 is the upper end, the left end, or the right end of content (S105). If the displayed position is the upper end, the left end, or the right end of content (S105/Yes), the threshold control unit 105 further determines whether the input operation is a first input operation requesting scrolling of the content (S107). If the input operation is the first input operation requesting scrolling of the content (S107/Yes), the threshold control unit 105 sets a threshold to S2 (S109).

If the displayed position is not the upper end, the left end, or the right end of content (S105/No), or if the input operation is not the first input operation requesting scrolling of the content (S107/No), the threshold control unit 105 sets a threshold to S1. Here, S1 is greater than S2, which has been described above (S111).

After the threshold control unit 105 sets the threshold in S109 or S111, the setting control unit 103 determines whether an operation distance of the input operation is greater than or equal to the set threshold (S113). If the operation distance of the input operation is less than the set threshold (S113/No), the information processing apparatus 11 finishes the operation relating to a change in the setting of a scrolling direction. If the operation distance of the input operation is greater than or equal to the threshold (S113/Yes), the setting control unit 103 changes the setting of a scrolling direction and causes the setting storage unit 107 to store the changed setting (S115).

The first input operation requesting scrolling includes both an input operation requesting first scrolling after content is displayed, and an input operation requesting first scrolling after a predetermined non-operating time (such as 3 hours) has been passed in the content.

According to the operations, if it is not possible to scroll content in a scrolling direction set for an input operation of the user 3, the information processing apparatus 11 determines that a scrolling direction intended by the user 3 for the input operation is different from the set scrolling direction. In such a case, the information processing apparatus 11 can automatically change the setting of the set scrolling direction.

The information processing apparatus 11 compares an operation distance of an input operation of the user 3 with a threshold. If the operation distance of the input operation is greater than or equal to the threshold, the information processing apparatus 11 can change the setting of a scrolling direction. According to the configurations, if the information processing apparatus 11 determines that the input operation is an operation error of the user 3, the information processing apparatus 11 can enhance the convenience of the user 3 by maintaining the setting of a scrolling direction.

If the information processing apparatus 11 determines that the threshold changing conditions are satisfied and a scrolling direction intended by the user 3 for an input operation is very likely to be different from the set scrolling direction, the information processing apparatus 11 can change the threshold into a smaller value. According to the configurations, the information processing apparatus 11 can prevent the setting of a scrolling direction from being changed through an operation error in usual use, while the information processing apparatus 11 can facilitate the setting of a scrolling direction to be change if the user 3 is very likely to feel uncomfortable.

Figure 9:
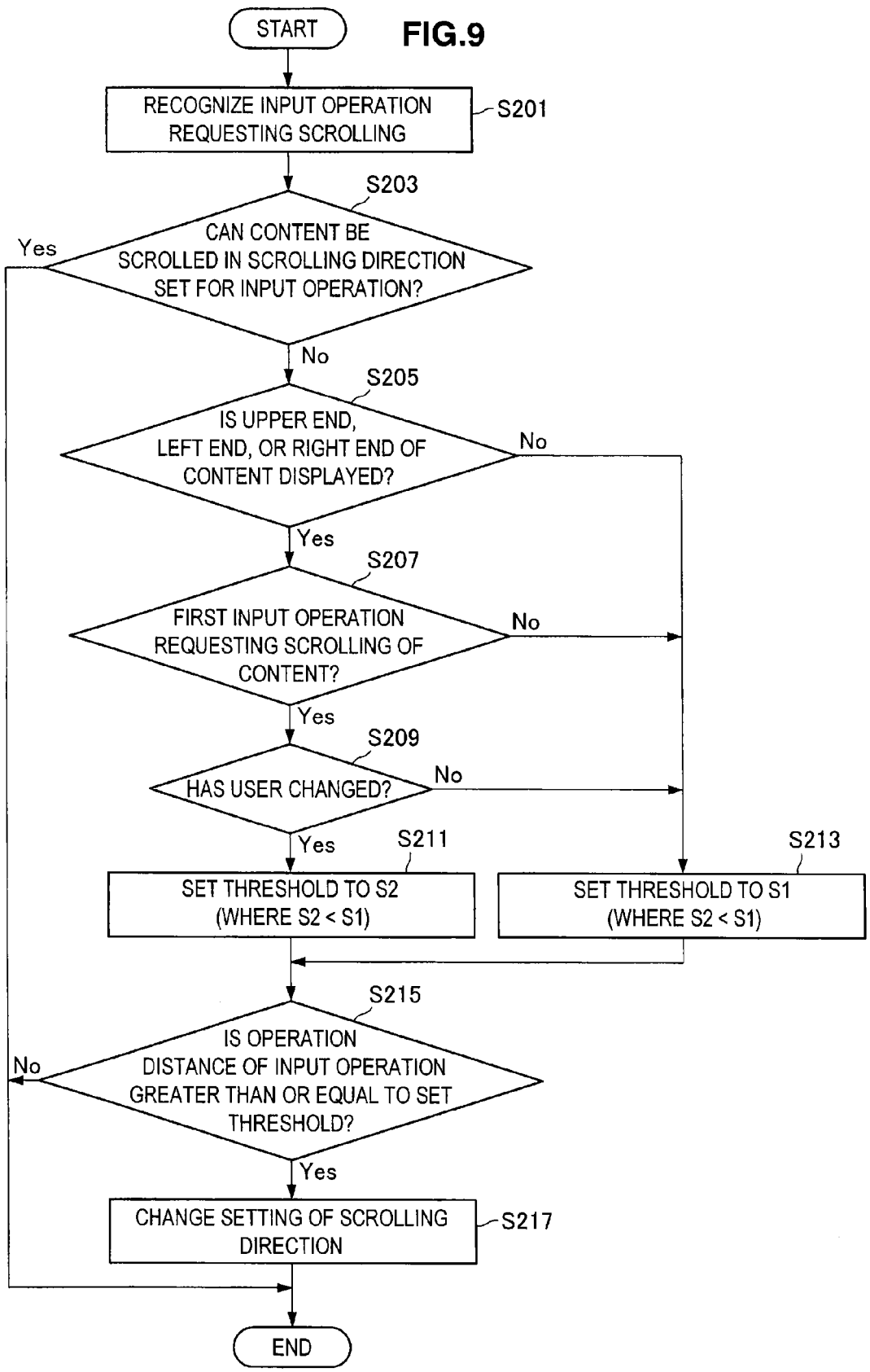
FIG. 9 is a flowchart illustrating a modified example of the operation of the information processing apparatus according to the first embodiment.

2.2.2. Modified Example of Operation of Information Processing Apparatus According to First Embodiment Next, a modified example of the operation of the information processing apparatus 11 according to the first embodiment of the present disclosure will be described with reference to FIG. 9. FIG. 9 is a flowchart illustrating the modified example of the operation of the information processing apparatus 11 according to the first embodiment.

The modified example of the operation of the information processing apparatus 11 according to the first embodiment includes determining whether the user 3 has changed as the threshold changing condition, in addition to the above-described example of the operation of the information processing apparatus 11 according to the first embodiment.

As illustrated in FIG. 9, since the operations in S201 to S207 and S211 to S217 are the same as the operations in S101 to S107 and S109 to S115 described with reference to FIG. 8, the detailed description will be herein omitted. The operations performed across S209, which are a feature of the modified example, will be described below.

In the modified example of the operation of the information processing apparatus 11 according to the first embodiment, it is determined whether the user 3 has changed (S209), after the threshold control unit 105 determines whether the input operation is a first input operation requesting scrolling of content (S207). Specifically, if it is determined in S207 that the input operation is the first input operation requesting scrolling of content (S207/Yes), the threshold control unit 105 determines on the basis of information from the user determining unit 115 whether the user 3 has changed (S209).

If the user 3 has changed (S209/Yes), the threshold control unit 105 sets a threshold to S2 (S211). Meanwhile, if the displayed position is not the upper end, the left end, or the right end of content (S205/No), if the input operation is not the first input operation requesting scrolling of content (S207/No), or if the user 3 has not changed (S209/No), the threshold control unit 105 sets a threshold to S1. Here, S1 is greater than S2 (S213). As in FIG. 8, the setting control unit 103 compares an operation distance of the input operation with the threshold after the threshold control unit 105 sets the threshold in S211 or S213.

According to the operations, the information processing apparatus 11 can use it as a threshold changing condition whether the user 3 has changed. If, for example, the user 3 changes while the information processing apparatus 11 is being used, the information processing apparatus 11 can thus makes determination such that the setting of a scrolling direction is facilitated to be changed.

3. INFORMATION PROCESSING APPARATUS ACCORDING TO SECOND EMBODIMENT

Figure 10:
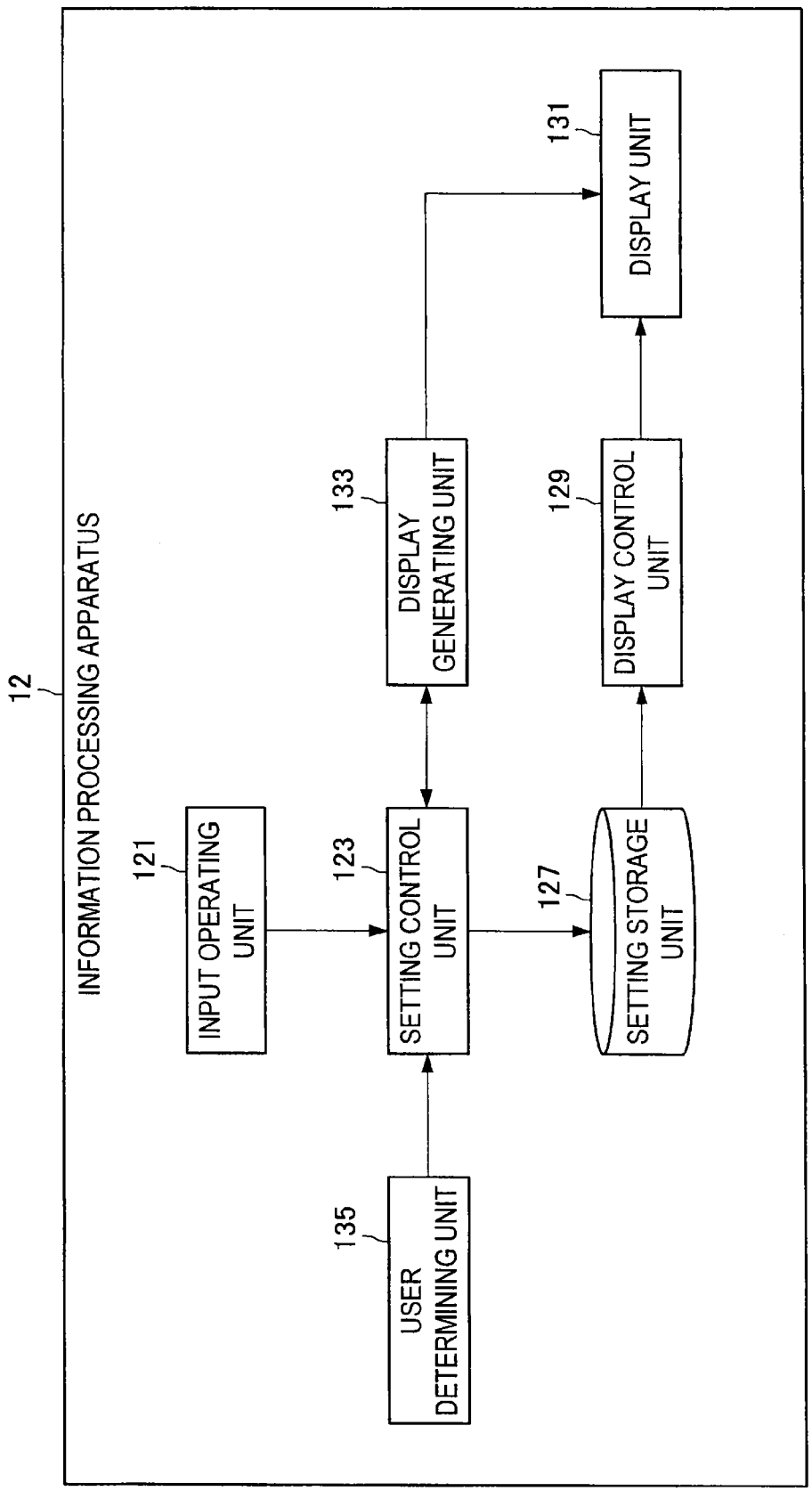
FIG. 10 is a block diagram describing an internal configuration of an information processing apparatus according to a second embodiment.

3.1. Internal Configuration of Information Processing Apparatus According to Second Embodiment Next, an internal configuration of an information processing apparatus 12 according to a second embodiment of the present disclosure will be described with reference to FIG. 10. The information processing apparatus 12 according to the second embodiment of the present disclosure has a different determination direction in changing a scrolling direction from a determination direction of the information processing apparatus 11 according to the first embodiment. FIG. 10 is a block diagram describing the internal configuration of the information processing apparatus 12 according to the second embodiment of the present disclosure.

As illustrated in FIG. 10, the information processing apparatus 12 according to the second embodiment of the present disclosure includes an input operating unit 121, a setting control unit 123, a setting storage unit 127, a display control unit 129, a display unit 131, a display generating unit 133, and a user determining unit 135.

The input operating unit 121 is the same as the input operating unit 101 described in the first embodiment. The setting storage unit 127 is the same as the setting storage unit 107. The display control unit 129 is the same as the display control unit 109. The display unit 131 is the same as the display unit 111. The display generating unit 133 is the same as the display generating unit 113. The user determining unit 135 is the same as the user determining unit 115. Accordingly, the individual detailed description will be omitted. The setting control unit 123 will be described below, which is a feature of the information processing apparatus 122 according to the second embodiment.

The setting control unit 123 determines on the basis of information from the user determining unit 135 whether the user 3 has changed. If the user 3 has changed, the setting control unit 123 changes the setting of a scrolling direction for an input operation.

If the user 3 has changed and another user performs an input operation, a scrolling direction set by the previous user 3 is very likely to be different from a scrolling direction intended by the other user for the input operation. Thus, in such a case, the setting control unit 123 preferably changes the setting of a scrolling direction for the input operation.

The setting control unit 123 determines whether a direction of a first input operation performed by a user is opposite to a direction of a second input operation performed by the user in displayed content. If both are opposite, the setting control unit 123 may change the setting of a scrolling direction for the input operations. According to the configuration, whether a region being displayed is an end of content, the information processing apparatus 12 can change the setting of a scrolling direction such that the user 3 does not feel uncomfortable.

If, for example, a user passes the information processing apparatus 12 to another user 3 and suggests that the user 3 operate content, a scrolling direction intended by the user 3, who has received the information processing apparatus 12, for the input operation is very likely to be different from the set scrolling direction. Accordingly, if a position of content being displayed is not an end of the content, the user 3, who has received the information processing apparatus 12, notices that the intended scrolling direction is different from the set scrolling direction, after performing a first input operation. In addition, the user 3 performs a second input operation in the opposite direction and has to scroll the content again.

The information processing apparatus 12 according to the second embodiment can change the setting of a scrolling direction even in the above-described case by detecting an input direction of the first input operation and an input direction of the second input operation. Thus, the information processing apparatus 12 according to the second embodiment also allows the user 3, who has received the information processing apparatus 12 displaying content, to scroll the content such that the user 3 does not feel uncomfortable.

In addition to the above-described condition, the setting control unit 123 may set thresholds for parameters of the first input operation and the second input operation, and may change the setting of a scrolling direction if the parameters are greater than or equal to, or less than or equal to the thresholds. If, for example, time intervals between which the first input operation and the second input operation are performed are less than or equal to the thresholds, the setting control unit 123 may change the setting of a scrolling direction. The setting control unit 123 may also change the setting of a scrolling direction on the basis of the operation distances of the first input operation and the second input operation or a relationship between the ratio and the threshold.

According to the configuration, even though a direction of a first input operation is accidentally opposite to a direction of a second input operation in usual use by the user 3, setting an appropriate threshold can prevent the setting of a scrolling direction from being unintentionally changed. In other words, only when a user feels uncomfortable with a scrolling direction upon a first input operation, the information processing apparatus 12 can change the setting of a scrolling direction.

Figure 11:
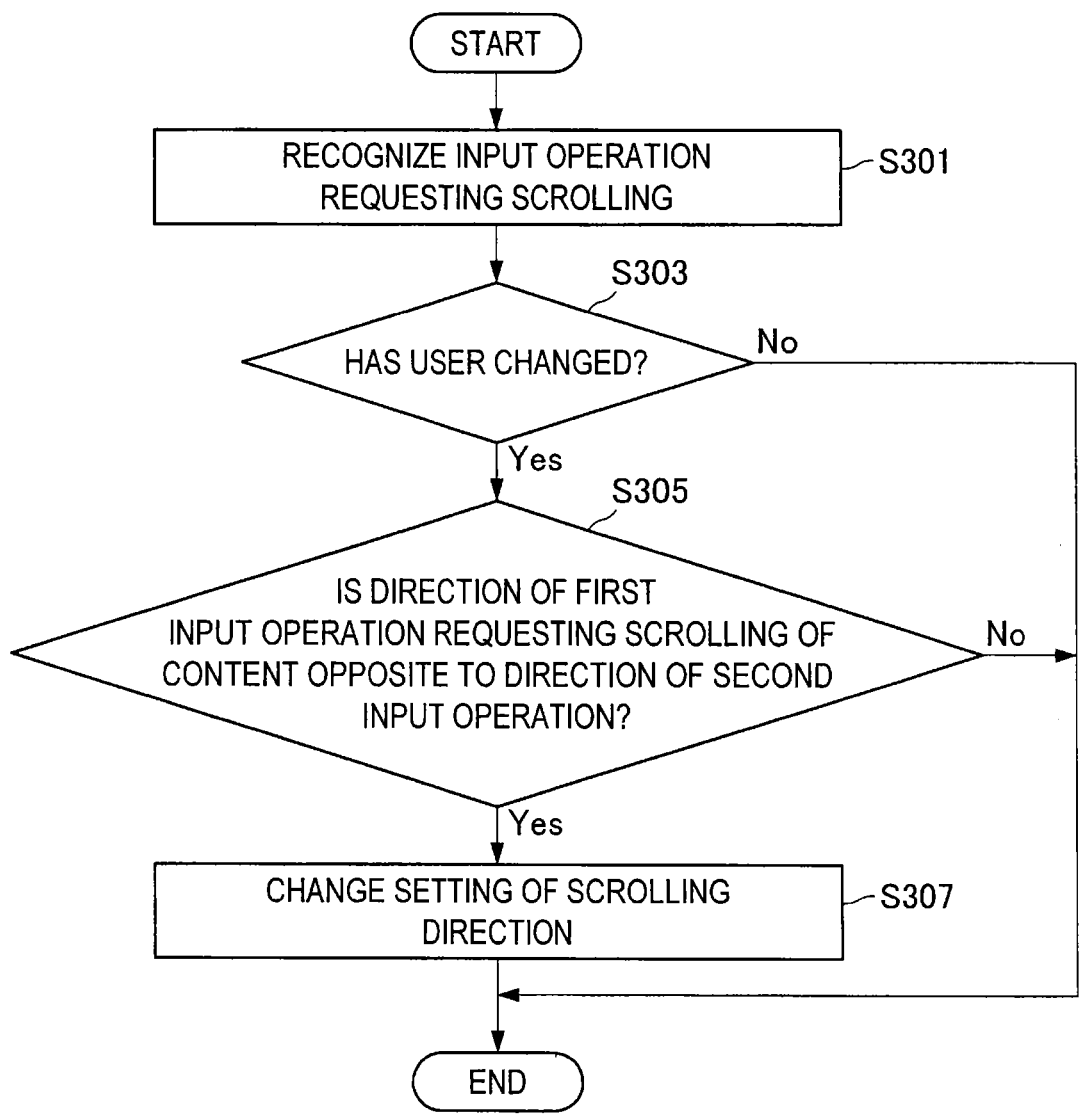
FIG. 11 is a flowchart illustrating an example of an operation of the information processing apparatus according to the second embodiment.

3.2. Example of Operation of Information Processing Apparatus According to Second Embodiment Subsequently, an example of an operation of the information processing apparatus 12 according to the second embodiment of the present disclosure will be described with reference to FIG. 11. FIG. 11 is a flowchart illustrating the example of the operation of the information processing apparatus 12 according to the second embodiment.

As illustrated in FIG. 11, the input operating unit 121 of the information processing apparatus 12 first recognizes an input operation from the user 3 (S301), the input operation requesting scrolling. The setting control unit 123 then determines on the basis of information from the user determining unit 135 whether the user 3 has changed (S303). If the user 3 has changed (S303/Yes), the setting control unit 123 determines whether a direction of a first input operation performed by the user 3 is opposite to a direction of a second input operation performed by the user 3 in displayed content (S305).

If the direction of the first input operation performed by the user 3 is opposite to the direction of the second input operation performed by the user 3 (S305/Yes), the setting control unit 123 changes the setting of a scrolling direction for the input operations (S307). To the contrary, if the user 3 has not changed (S303/No) or if the direction of the first input operation performed by the user 3 is not opposite to the direction of the second input operation performed by the user 3 (S305/No), the setting control unit 123 does not change the setting of a scrolling direction for the input operations and finishes the operation.

According to the operation, if the user 3 has changed, the information processing apparatus 12 can detect the first input operation of the user 3 and the second input operation the direction of which is opposite to the direction of the first input operation, and can change the setting of a scrolling direction. Thus, even if a user passes the information processing apparatus 12 to another user 3, the information processing apparatus 12 allows content to be scrolled such that the user 3, who has received the information processing apparatus 12, does not feel uncomfortable.

4. HARDWARE CONFIGURATION OF INFORMATION PROCESSING APPARATUS ACCORDING TO EMBODIMENT OF PRESENT DISCLOSURE

Figure 12:
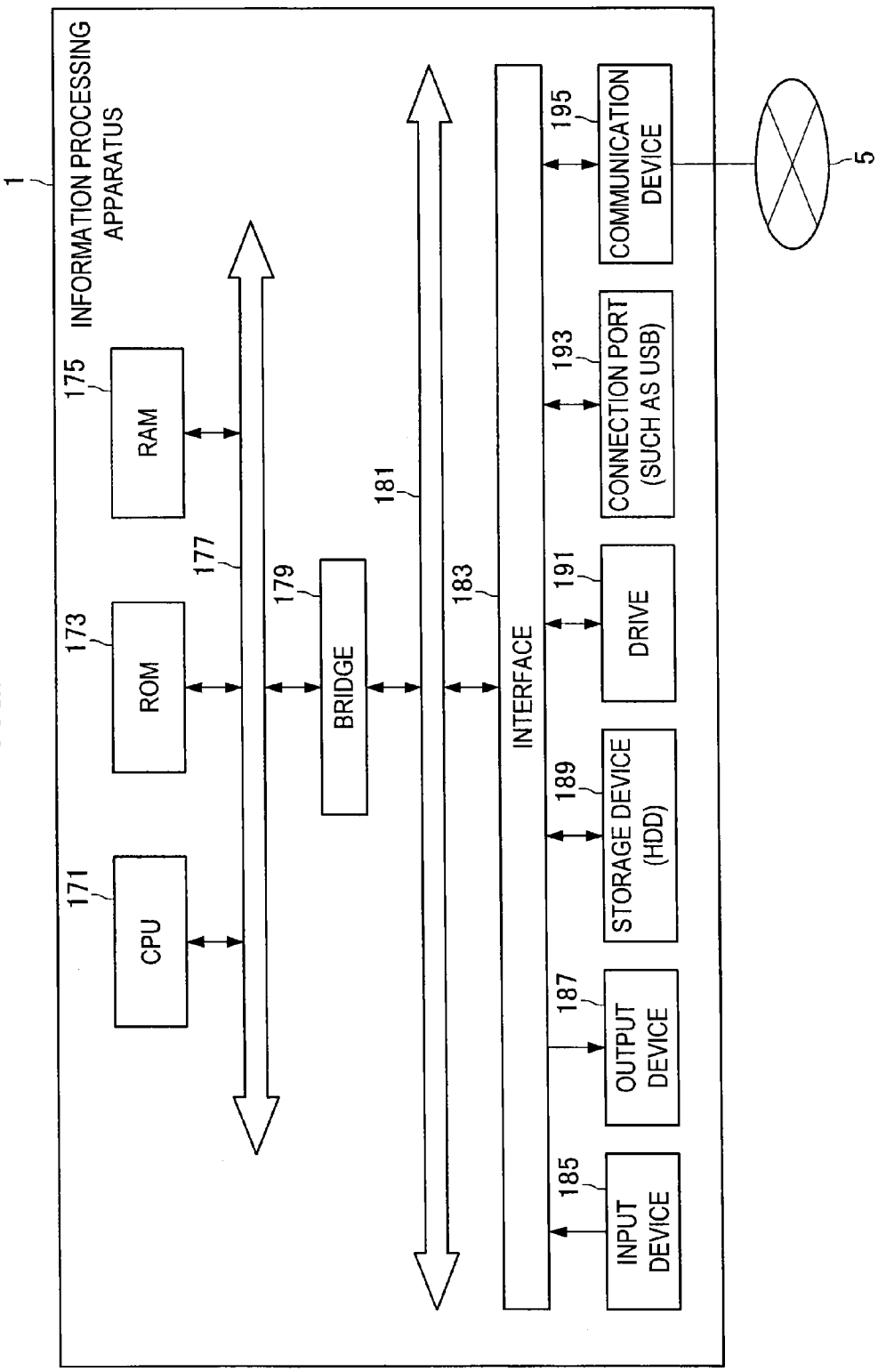
FIG. 12 is an explanatory diagram illustrating an example of a hardware configuration of an information processing apparatus according to an embodiment of the present disclosure.

A hardware configuration of an information processing apparatus 1 according to an embodiment of the present disclosure will be described below with reference to FIG. 12. FIG. 12 is an explanatory diagram describing the hardware configuration of the information processing apparatus 1. Software and hardware cooperate with each other to execute information processing of the information processing apparatus 1.

As illustrated in FIG. 12, the information processing apparatus 1 includes a central processing unit (CPU) 171, read only memory (ROM) 173, random access memory (RAM) 175, a bridge 179, an internal buses 177 and 181, an interface 183, an input device 185, a display device 187, a storage device 189, a drive 191, a connection port 193, and a communication device 195.

The CUP 171 functions as a processing device and a control device, and controls the whole operation of the information processing apparatus 1 in accordance with a variety of programs. The ROM 173 stores a program and an operation parameter used by the CPU 171, while the RAM 175 temporarily stores a program used upon the execution of the CPU 171 and a parameter changing as desired upon the execution. The CPU 171 executes, for example, the functions of the setting control units 103 and 123, the threshold control unit 105, the display control units 109 and 129, the display generating units 113 and 133, and the user determining units 115 and 135.

These CPU 171, ROM 173, and RAM 175 are connected to each other by the bridge 179 and the internal buses 177 and 179. The CPU 171, the ROM 173, and the RAM 175 are also connected to the input device 185, the display device 187, the storage device 189, the drive 191, the connection port 193, and the communication device 195 via the interface 183.

The input device 185 includes an input unit used for the user 3 to input information such as a touch pad, a mouse, a trackball, a rotational wheel, a jog dial, a ring-shaped dial, a cross key, a motion sensor, an attitude sensor, and an OFN, and an input control circuit used for generating an input signal on the basis of an input of the user 3 and outputting the input signal to the CPU 171. The input device 185 executes, for example, the functions of the input operating unit 101 and 121.

The display device 187 includes, for example, an LCD device, an OLED device, a plasma display device, a CRT device, and a lamp. The display device 187 executes, for example, the functions of the display units 111 and 131.

The storage device 189 is a data storage device, which is includes as an example of a storage unit of the information processing apparatus 1. The storage device 189 may include a storage medium, a storage device that stores data in a storage medium, a readout device that reads data out from a storage medium, and a deletion device that deletes stored data. The storage device 189 executes, for example, the functions of the setting storage units 107 and 127.

The drive 191 is a reader/writer for a storage medium, and is built in or externally attached to the information processing apparatus 1. The drive 191 reads out data stored in a removable storage medium such as a mounted magnetic disk, optical disc, magneto-optical disk, and semiconductor memory, and outputs the readout data to the RAM 175. The drive 191 can also write information into a removable storage medium.

The connection port 193 is, for example, a connection interface including a connection port such as a universal serial bus (USB) port and an optical audio terminal for connecting an external connection apparatus.

The communication device 195 is, for example, a communication interface including a communication device for a connection to a network 5. The communication device 195 may also be a communication device supporting a wireless LAN or a cable communication device that performs wired cable communication.

Additionally, the network 5 is a wired or wireless transmission path through which information is transmitted and received between apparatuses connected to the network 5. The network 5 may include, for example, a public network such as the Internet, a telephone network, and a satellite communication network, a LAN, and a wide area network (WAN).

It is also possible to fabricate a computer program for causing hardware such as the CPU, ROM, and RAM built in the information processing apparatus 1 to implement the same functions as each of the above-mentioned components of the information processing apparatus 1. There is also provided a storage medium having the computer program stored therein.

5. CONCLUSION

As described above in detail, the information processing apparatus 1 according to the embodiment of the present disclosure allows the setting of a scrolling direction to be automatically changed, on the basis of a situation in which the user 3 has performed an input operation, such that the user 3 does not feel uncomfortable. Specifically, if the information processing apparatus 1 is not able to scroll content in a scrolling direction set for an input operation of the user 3, the information processing apparatus 1 determines that the scrolling direction intended by the user 3 for the input operation is different from the set scrolling direction. In such a case, the information processing apparatus 1 can change the setting of a scrolling direction such that the scrolling direction intended by the user 3 for the input operation is the same as the set scrolling direction. Thus, the information processing apparatus 1 according to the embodiment of the present disclosure can prevent the user 3 from feeling uncomfortable with the movement of content with respect to the input operation of the user 3.

If an operation distance of an input operation is greater than or equal to a threshold, the information processing apparatus 1 changes the setting of a scrolling direction. Thus, if the operating direction of the input operation is so short that the input operation is determined as an operation error of the user 3, the information processing apparatus 1 can maintain the setting of a scrolling direction, while the information processing apparatus 1 can change the setting of a scrolling direction only when the user 3 feels uncomfortable with the scrolling direction for the input operation.

If a scrolling direction intended by the user 3 for an input operation is very likely to be different from the scrolling direction set for the input operation, the information processing apparatus 1 can change a threshold into a smaller value. Thus, while preventing the setting of a scrolling direction from being changed through an operation error in usual use, the information processing apparatus 1 can facilitate the setting of a scrolling direction to be changed if it is predicted that the user 3 feels uncomfortable.

The information processing apparatus 1 further recognizes the user 3 to determine whether the user 3 has changed. The information processing apparatus 1 can hereby change the setting of a scrolling direction or a threshold. Thus, the information processing apparatus 1 can manage and change the setting of a scrolling direction for each user 3.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below.

(1) An information processing apparatus including:
an input operating unit configured to receive an input operation from a user, the input operation allowing content to be scrolled; and
a setting control unit configured to change a setting of a scrolling direction for the content on the basis of a situation in which the input operation has been performed.

(2) The information processing apparatus according to (1), wherein, when it is not possible to scroll the content in a scrolling direction specified by the user with the input operation, the setting control unit changes the setting of the scrolling direction.

(3) The information processing apparatus according to (1) or (2),
wherein, when an operation distance of the input operation is greater than or equal to a threshold, the setting control unit changes the setting of the scrolling direction.

(4) The information processing apparatus according to (3), further including:
a threshold control unit configured to change the threshold when a predetermined threshold changing condition is satisfied.

(5) The information processing apparatus according to (4),
wherein, when the threshold changing condition is satisfied, the threshold control unit changes the threshold into a smaller value than a threshold set at a time when the threshold changing condition is not satisfied.

(6) The information processing apparatus according to (4) or (5),
wherein, when a position at which the input operation has been performed is an end of the content, the threshold control unit changes the threshold.

(7) The information processing apparatus according to any one of (4) to (6),
wherein, when the input operation performed on the content is a first input operation, the threshold control unit changes the threshold.

(8) The information processing apparatus according to any one of (4) to (7), further including:
a user determining unit configured to determine whether the user has changed,
wherein, when the user has changed, the threshold control unit changes the threshold.

(9) The information processing apparatus according to (1), further including:
a user determining unit configured to determine whether the user has changed,
wherein, when the user has changed, the setting control unit changes the setting of the scrolling direction.

(10) The information processing apparatus according to (9),
wherein, when a direction of a first input operation performed by the user is opposite to a direction of a second input operation performed by the user, the setting control unit changes the setting of the scrolling direction.

(11) The information processing apparatus according to any one of (1) to (10), further including:
a display generating unit configured to generate display notifying the user that the setting of the scrolling direction has been changed, when the setting control unit changes the setting of the scrolling direction.

(12) The information processing apparatus according to any one of (1) to (10), further including:
a display generating unit configured to generate display asking the user to choose whether to change the setting of the scrolling direction, when the setting control unit changes the setting of the scrolling direction,
wherein, when the user chooses to change the setting of the scrolling direction, the setting control unit changes the setting of the scrolling direction.

(13) The information processing apparatus according to any one of (1) to (12),
wherein the input operating unit includes a plurality of input operating units, and
wherein the setting control unit changes the setting of the scrolling direction for the content for each of the input operating units.

(14) The information processing apparatus according to any one of (1) to (13), further including:
a display unit configured to display the content,
wherein the input operating unit is separated from the display unit.

(15) An information processing method including:
  receiving an input operation from a user, the input operation allowing content to be scrolled; and
  changing a setting of a scrolling direction for the content on the basis of a situation in which the input operation has been performed.

(16) A program for causing a computer to function as:
  an input operating unit configured to receive an input operation from a user, the input operation allowing content to be scrolled; and
  a setting control unit configured to change a setting of a scrolling direction for the content on the basis of a situation in which the input operation has been performed.

What is claimed is:

1. An information processing apparatus comprising:
  circuitry configured to
    receive an input operation from a user, the input operation requesting content to be scrolled in a first direction;
    determine whether the input operation is a first input operation, the first input operation being a scrolling operation received after a predetermined time period has elapsed while displaying the content without receiving an input operation;
    set an operation distance threshold to a first value when the input operation is determined to be the first input operation;
    set the operation distance threshold to a second value greater than the first value when the input operation is determined not to be the first input operation; and
    change a scrolling direction for the content to a second direction opposite to the first direction when an operation distance of the input operation exceeds the set threshold,
  wherein the circuitry is further configured ask the user to choose whether to change the scrolling direction, prior to the circuitry changing the scrolling direction, and
  wherein, when the user chooses to change the scrolling direction, the circuitry changes the scrolling direction.

2. The information processing apparatus according to claim 1, wherein, in response to a determination that it is not possible to scroll the content in the first direction specified by the user with the input operation, the circuitry is configured to perform the determining whether the input operation is the first input operation, the setting the operation distance threshold, and the changing the scrolling direction.

3. The information processing apparatus according to claim 2, wherein the circuitry is configured to perform the determining whether the input operation is the first input operation, the setting the operation distance threshold, and the changing the scrolling direction in response to a determination that an end of the content is displayed.

4. The information processing apparatus according to claim 3, wherein
  the circuitry is further configured to determine whether the user has changed, and
  the circuitry is configured to perform the determining whether the input operation is the first input operation, the setting the operation distance threshold, and the changing the scrolling direction in response to a determination that the user has changed.

5. The information processing apparatus according to claim 1, wherein the circuitry is further configured to determine whether the user has changed to a new user,
  Wherein, when the user has changed to the new user, the circuitry changes the scrolling direction to the second direction.

6. The information processing apparatus according to claim 5,
  wherein, when a direction of an input operation performed by the new user is opposite to a direction of a following input operation performed by the new user, the circuitry changes the scrolling direction to the second direction.

7. The information processing apparatus according to claim 3, wherein the circuitry is further configured to notify the user that the scrolling direction has been changed, when the circuitry changes the scrolling direction.

8. The information processing apparatus according to claim 1,
  further comprising a plurality of input operating units,
  wherein the circuitry is configured to change the scrolling direction for the content for each of the input operating units.

9. The information processing apparatus according to claim 1, further comprising:
  a display unit configured to display the content,
  wherein the circuitry is separated from the display unit.

10. An information processing method comprising:
  receiving an input operation from a user, the input operation requesting content to be scrolled in a first direction;
  determining whether the input operation is a first input operation, the first input operation being a scrolling operation received after a predetermined time period has elapsed while displaying the content without receiving an input operation;
  setting an operation distance threshold to a first value when the input operation is determined to be the first input operation;
  setting the operation distance threshold to a second value greater than the first value when the input operation is determined not to be the first input operation; and
  changing a scrolling direction for the content to a second direction opposite to the first direction when an operation distance of the input operation exceeds the set threshold,
  wherein the method further comprises asking the user to choose whether to change the scrolling direction, prior to the circuitry changing the scrolling direction, and
  wherein, when the user chooses to change the scrolling direction, the method changes the scrolling direction.

11. A non-transitory computer-readable storage medium storing computer-readable instructions thereon, which, when executed by a computer, cause the computer to perform a method comprising:
  receiving an input operation from a user, the input operation requesting content to be scrolled in a first direction;
  determining whether the input operation is a first input operation, the first input operation being a scrolling operation received after a predetermined time period has elapsed while displaying the content without receiving an input operation;
  setting an operation distance threshold to a first value when the input operation is determined to be the first input operation;
  setting the operation distance threshold to a second value greater than the first value when the input operation is determined not to be the first input operation; and
  changing a scrolling direction for the content to a second direction opposite to the first direction when an operation distance of the input operation exceeds the set threshold, wherein the method further comprises asking the user to choose whether to change the scrolling direction, prior to the circuitry changing the scrolling direction, and wherein, when the user chooses to change the scrolling direction, the method changes the scrolling direction.

* * * * *